(12) United States Patent
Kobayashi

(10) Patent No.: US 12,100,985 B2
(45) Date of Patent: *Sep. 24, 2024

(54) BATTERY MANAGEMENT SYSTEM AND CELL SUPERVISING CIRCUIT

(71) Applicant: NUVOTON TECHNOLOGY CORPORATION JAPAN, Kyoto (JP)

(72) Inventor: Hitoshi Kobayashi, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 554 days.

This patent is subject to a terminal disclaimer.

(21) Appl. No.: 17/185,385

(22) Filed: Feb. 25, 2021

(65) Prior Publication Data

US 2021/0184481 A1 Jun. 17, 2021

Related U.S. Application Data

(63) Continuation of application No. PCT/JP2019/033494, filed on Aug. 27, 2019.

(30) Foreign Application Priority Data

Aug. 29, 2018 (JP) .................................. 2018-160143

(51) Int. Cl.
 *H02J 7/00* (2006.01)
 *H01M 10/48* (2006.01)
 *H02J 7/04* (2006.01)

(52) U.S. Cl.
 CPC ........... *H02J 7/0048* (2020.01); *H01M 10/48* (2013.01); *H02J 7/00032* (2020.01);
 (Continued)

(58) Field of Classification Search
 USPC ....................................................... 320/134
 See application file for complete search history.

(56) References Cited

U.S. PATENT DOCUMENTS 9,153,973 B2  10/2015  Nalbant
9,667,073 B2   5/2017  Wu
(Continued)

FOREIGN PATENT DOCUMENTS

EP    3264560 A1    1/2018
JP  2014-211402 A  11/2014
(Continued)

OTHER PUBLICATIONS

International Search Report and Written Opinion issued on Oct. 15, 2019 in International Application No. PCT/JP2019/033494; with partial English translation.
(Continued)

*Primary Examiner* — Samuel Berhanu
(74) *Attorney, Agent, or Firm* — Rimon P.C.

(57) ABSTRACT

A BMS includes cell supervising circuits connected to an alternating current power line via a transformer, and a BMU connected to the alternating current power line via a transformer. The BMU includes a control microcomputer which instructs at least one of the cell supervising circuits to control the state of charge of a secondary battery cell monitored by the at least one of the cell supervising circuits, based on pieces of information in the cell supervising circuits, the pieces of information indicating states of charge of secondary battery cells monitored by the cell supervising circuits.

13 Claims, 8 Drawing Sheets

(52) U.S. Cl.
CPC .............. *H02J 7/0013* (2013.01); *H02J 7/04* (2013.01); *H02J 2207/20* (2020.01)

(56) References Cited

U.S. PATENT DOCUMENTS

| | | | | |
|---|---|---|---|---|
| 2006/0097696 | A1* | 5/2006 | Studyvin ............... | H02J 7/0018 |
| | | | | 320/116 |
| 2012/0306506 | A1* | 12/2012 | Kiuchi ............... | G01R 31/3842 |
| | | | | 324/434 |
| 2014/0062192 | A1* | 3/2014 | Vichnyakov ............ | H02J 3/381 |
| | | | | 307/26 |
| 2014/0232344 | A1 | 8/2014 | Drobnik | |
| 2016/0269195 | A1 | 9/2016 | Coenen et al. | |
| 2018/0038916 | A1 | 2/2018 | Haag et al. | |
| 2018/0191173 | A1 | 7/2018 | James et al. | |
| 2018/0366959 | A1* | 12/2018 | Coenen ................ | G01R 31/392 |

FOREIGN PATENT DOCUMENTS

| | | |
|---|---|---|
| JP | 2016-535489 A | 11/2016 |
| WO | 2015/059314 A1 | 4/2015 |
| WO | 2017/109226 A1 | 6/2017 |

OTHER PUBLICATIONS

Extended European Search Report dated on May 12, 2021 issued in corresponding European Patent Application No. 19855312.5.
Communication pursuant to Article 94(3) EPC issued on Dec. 5, 2023 for the corresponding European patent application No. 19855312.5.

\* cited by examiner

BATTERY MANAGEMENT SYSTEM AND CELL SUPERVISING CIRCUIT

CROSS REFERENCE TO RELATED APPLICATIONS

This is a continuation application of PCT International Application No. PCT/JP2019/033494 filed on Aug. 27, 2019, designating the United States of America, which is based on and claims priority of Japanese Patent Application No. 2018-160143 filed on Aug. 29, 2018. The entire disclosures of the above-identified applications, including the specifications, drawings and claims are incorporated herein by reference in their entirety.

FIELD

The present disclosure relates to a battery management system and a cell supervising circuit included in the same.

BACKGROUND

PTL 1 relates to a battery system including a plurality of battery cells, and particularly relates to a cell balancing system for a battery system including a plurality of battery cells and a method in a traditional technique for balancing the battery cells.

CITATION LIST

Patent Literature

PTL 1: U.S. Pat. No. 9,153,973

SUMMARY

Technical Problem

The present disclosure provides a battery management system which can suppress a failure of cell balancing caused by a variation in operating power among cell supervising circuits, and a cell supervising circuit included in the same.

Solution to Problem

The battery management system according to one aspect of the present disclosure includes cell supervising circuits connected to an alternating current power line; and a management device connected to the alternating current power line. The management device includes an information processor which instructs at least one of the cell supervising circuits to control a state of charge of a storage cell monitored by the at least one of the cell supervising circuits, based on pieces of information in the cell supervising circuits, the information indicating a state of charge of a storage cell monitored by each of the cell supervising circuits.

The cell supervising circuit according to one aspect of the present disclosure is a cell supervising circuit which monitors a storage cell, the cell supervising circuit including an insulating element for receiving electric power through an alternating current power line in a non-contact manner; a communication circuit which receives an instruction to control a state of charge of the storage cell from a management device which manages the state of the storage cell, the management device being connected to the alternating current power line via the insulating element; and a circuit which controls the state of charge of the storage cell based on the instruction.

Advantageous Effects

The present disclosure implements a battery management system which can suppress the failure of cell balancing in operating power among the cell supervising circuits, and a cell supervising circuit included in the same.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Embodiment 1

[Configuration]

Figure 1:
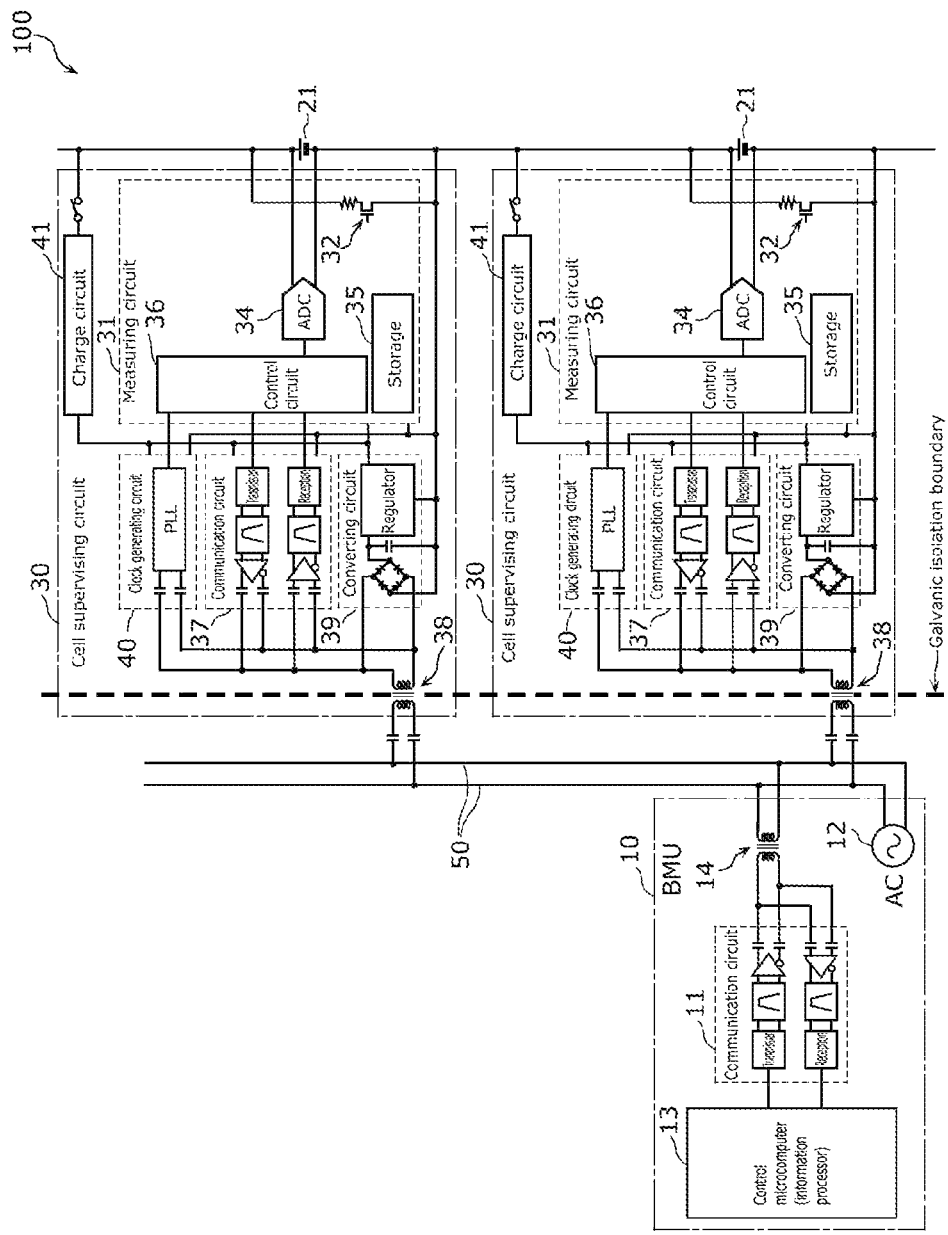
FIG. 1 is a diagram illustrating an outline of the functional configuration of the BMS according to Embodiment 1.

The battery management system (BMS) according to Embodiment 1 will now be described. Initially, the configuration of the BMS according to Embodiment 1 will be described. FIG. 1 is a diagram illustrating an outline of the functional configuration of the BMS according to Embodiment 1.

BMS 100 according to Embodiment 1 is mounted on a vehicle such as an electric vehicle, for example. BMS 100 includes battery management unit (BMU) 10, secondary battery cells 21, and cell supervising circuits (CSCs) 30 corresponding to secondary battery cells 21. Although two second battery cells 21 and two cell supervising circuits 30 are illustrated in FIG. 1, the number of secondary battery cells 21 and that of cell supervising circuits 30 are not limited to two, and may be three or more. Alternatively, BMS 100 may include only one secondary battery cell 21 and only one cell supervising circuit 30. BMU 10 and cell supervising circuits 30 are connected to alternating current power line 50 via a transformer.

BMU 10 supervises the states of secondary battery cells 21 and performs charge control of secondary battery cells 21. Secondary battery cell 21 is one example of a storage cell. Specifically, secondary battery cell 21 is a lithium ion battery, and may be another battery such as a nickel hydrogen battery. Secondary battery cells 21 are connected in serial, for example. Part or all of them may be connected in parallel. Secondary battery cells 21 constitute an assembled battery.

Instead of secondary battery cells 21, BMS 100 may include energy storage capacitor cells. The energy storage capacitor cell is another example of the storage cell. Specifically, the energy storage capacitor cell is an electrical double-layer capacitor, and may be a lithium ion capacitor or the like.

Specifically, BMU 10 includes communication circuits 11, alternating current power supply 12, control microcomputer 13, and transformer 14. To be noted, it is sufficient that BMU 10 includes at least control microcomputer 13.

Communication circuit 11 is one example of a second communication circuit, which allows BMU 10 to communicate with each of cell supervising circuits 30 via alternating current power line 50. Communication circuit 11 specifically includes a transmission circuit for transmitting a signal, a filter, an amplification circuit, a reception circuit for receiving a signal, a filter, and an amplification circuit. Alternating current power line 50 used in communication is a power line shared with BMU 10 and cell supervising circuits 30, and is connected to BMU 10 and cell supervising circuits 30 via transformers. Alternating current power line 50 is used to feed electric power from alternating current power supply 12 to cell supervising circuits 30.

Alternating current power supply 12 feeds AC power to each of cell supervising circuits 30 via alternating current power line 50. Thus, in BMS 100, the AC power is fed from BMU 10 to each of cell supervising circuits 30 across the galvanic isolation boundary. In other words, each cell supervising circuit 30 operates by the power fed from alternating current power supply 12 but not from assembled battery 20.

Control microcomputer 13 supervises the states of secondary battery cells 21, and controls a plurality of assembled batteries 20. Control microcomputer 13 is one example of an information processor.

Cell supervising circuits 30 are circuits having one-to-one correspondence with secondary battery cells 21. In other words, one cell supervising circuit 30 supervises only one secondary battery cell 21. Cell supervising circuit 30 is a circuit module, and is formed by packaging circuit parts on a substrate. Specifically, cell supervising circuit 30 includes measuring circuit 31, communication circuit 37, transformer 38, converting circuit 39, clock generating circuit 40, and charge circuit 41.

Measuring circuit 31 measures the state of charge of the target secondary battery cell 21. Specifically, measuring circuit 31 measures the voltage of the target secondary battery cell 21 as a parameter indicating the state of charge of the target secondary battery cell 21. Measuring circuit 31 includes switching element 32, AD converter 34, storage 35, and control circuit 36. To be noted, it is sufficient that measuring circuit 31 measures the parameter directly or indirectly indicating the state of charge.

Switching element 32 turns on secondary battery cell 21 connected thereto to cause secondary battery cell 21 to discharge. Thus, the state of charge is adjusted.

AD converter 34 converts an analog voltage of secondary battery cell 21 into a digital voltage.

Storage 35 is a nonvolatile semiconductor memory, for example, and stores an address for distinguishing cell supervising circuit 30 from other cell supervising circuits 30 (in other words, identification information or an identification code). This address can also be considered as the identification information for distinguishing secondary battery cell 21 from other secondary battery cells 21. Although storage 35 is illustrated as part of measuring circuit 31 (in other words, is included in measuring circuit 31) in the example of FIG. 1, storage 35 may be disposed as a component separated from measuring circuit 31.

Control circuit 36 generates information including the value of the digital voltage output from AD converter 34 and the address stored in storage 35 (also referred to as information indicating the state of charge measured by measuring circuit 31), and outputs the generated information to communication circuit 37. In other words, control circuit 36 is a control logic circuit.

Communication circuit 37 is one example of a first communication circuit, and transmits the information indicating the state of charge measured by measuring circuit 31 to BMU 10, which manages the state of second battery cell 21, via transformer 38. Specifically, communication circuit 37 includes a transmission circuit for transmitting a signal, a filter, an amplification circuit, a reception circuit for receiving a signal, a filter, and an amplification circuit.

Transformer 38 is an insulating element which enables measuring circuit 31 to receive power supply in a non-contact manner from alternating current power supply 12, which is a power supply different from second battery cell 21. Instead of transformer 38, cell supervising circuit 30 may include another coil element as the insulating element.

Converting circuit 39 converts the AC power, which is fed from alternating current power supply 12 via transformer 38, to the DC power to feed the DC power to measuring circuit 31, communication circuit 37, clock generating circuit 40, and charge circuit 41. Specifically, converting circuit 39 includes a full-wave rectification circuit, a smoothing circuit, and a regulator.

The frequency of the AC power fed by alternating current power supply 12 is several hundreds kilohertz (kHz), for example, and more specifically, 350 kHz, for example. The effective value of the AC voltage is 5 V, for example. The frequency and the effective value of alternating current power supply 12 are not particularly limited.

Clock generating circuit 40 generates a clock signal in synchronization with the frequency of the AC power. Measuring circuit 31 measures the voltage of secondary battery cell 21 based on the generated clock signal. Specifically, clock generating circuit 40 is implemented by a phase synchronization circuit (or a phase locked loop (PLL) circuit). Clock generating circuit 40 can synchronize the system clocks of cell supervising circuits 30.

Charge circuit 41 charges secondary battery cell 21 with the DC power output by converting circuit 39. The operation of charge circuit 41 is controlled by control circuit 36, for example.

[Differences from Configuration of Standard BMS]

To suppress heat generation, ignition, explosion, and degradation caused by overcharge of secondary battery cell 21 and to maximize the states of charge of the secondary battery cells, a standard BMS performs cell balancing processing to balance the states of charge (SOC) of the secondary battery cells, and then charges assembled battery 20. At this time, the BMU performs daisy-chain (string) communication with the cell supervising circuits to manage the states of charge of the secondary battery cells (in other words, the voltages of the secondary battery cells).

In such a standard BMS, electric power is fed to each of cell supervising circuits 30 from the secondary battery cell, which is the target to be monitored by the cell supervising circuit. In such a configuration, the cell balancing is failed due to a variation in operating power among the cell supervising circuits. In particular, a variation in operating power caused by the difference in frequency of communication among the cell supervising circuits is a significant cause to fail the cell balancing.

To suppress the failure of cell balancing, a method of feeding electric power to a cell supervising circuit from another power supply different from the secondary battery cell (such as a 12 V battery in applications where the BMS is mounted on a vehicle) is considered. In this method, the another power supply should be galvanically isolated from the secondary battery cell. The method of feeding electric power from another power supply to the cell supervising circuit is specifically feeding of electric power to the cell supervising circuit by an insulating DC-DC converter using a transformer.

However, when the method of feeding electric power from another power supply to the cell supervising circuit is used in the standard BMS, a power supply path (such as a wiring or a harness) should be disposed between a plurality of cell supervising circuits and the BMU. This causes new problems such as an increase in the number of parts and an increase in weight.

In contrast, BMS 100 also uses the power supply path (alternating current power line 50 and transformer 38) of alternating current power supply 12 as the communication path for BMU 10 and cell supervising circuits 30. Thus, it is unnecessary to separately dispose another power supply path. In other words, BMS 100 can suppress an increase in the number of parts and an increase in weight and can suppress the failure of cell balancing caused by a variation in operating power among cell supervising circuits 30.

The frequency bandwidth used in communication is higher than the frequency of the AC power. In other words, communication circuit 11 and communication circuit 37 communicate using a frequency bandwidth higher than the frequency of the AC power. The carrier wave frequency of communication is 20 MHz, for example.

The frequency bandwidth used in communication may be divided into a plurality of frequency channels. For example, each of cell supervising circuits 30 uses part of the frequency bandwidth as a communication channel assigned to cell supervising circuit 30. Thereby, the communication rate and the communication quality can be improved.

[Operation]

Figure 2:
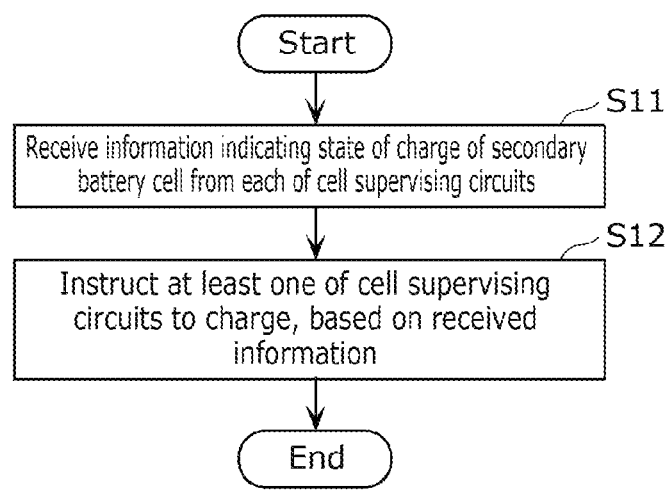
FIG. 2 is a flowchart illustrating the operation of the BMS according to Embodiment 1.

BMS 100 can easily perform an active cell balancing processing. Hereinafter, such an operation of BMS 100 will be described. FIG. 2 is a flowchart illustrating the operation of BMS 100.

First, each of cell supervising circuits 30 transmits the information indicating the state of charge of secondary battery cell 21, which is measured by measuring circuit 31, through communication circuit 37. Communication circuit 11 in BMU 10 receives the pieces of information indicating the states of charge of secondary battery cells 21, which are the targets monitored by cell supervising circuits 30, from cell supervising circuits 30, respectively (S11). As described above, each information contains an address, and BMU 10 (control microcomputer 13) can distinguish the states of charge of secondary battery cells 21.

Next, based on the received pieces of information, control microcomputer 13 in BMU 10 instructs at least one of cell supervising circuits 30 to charge secondary battery cell 21 using the AC power obtained through alternating current power line 50 (S12).

Specifically, based on the pieces of information indicating the states of charge, which are received in step S11, control microcomputer 13 specifies secondary battery cell 21 having the highest state of charge as the target cell. Subsequently, control microcomputer 13 instructs cell supervising circuit 30 which monitors another secondary battery cell 21 other than the target cell to charge another secondary battery cell 21 monitored by another cell supervising circuit 30 until the state of charge of another secondary battery cell 21 is substantially equal to the state of charge of the target cell. This instruction is performed through the communication between communication circuit 11 and communication circuit 37 (i.e., communication using alternating current power line 50), and control circuit 36 of cell supervising circuit 30 which receives the instruction causes charge circuit 41 to charge secondary battery cell 21.

As described above, by charging secondary battery cells 21, BMS 100 can successfully provide cell balancing among secondary battery cells 21 connected to cell supervising circuits 30, respectively. The active cell balancing processing implemented by BMS 100 can suppress heat generation, which is a problem in a passive cell balancing processing where secondary battery cells 21 are forcibly discharged to perform conversion to thermal energy.

Embodiment 2

[Configuration]

Figure 3:
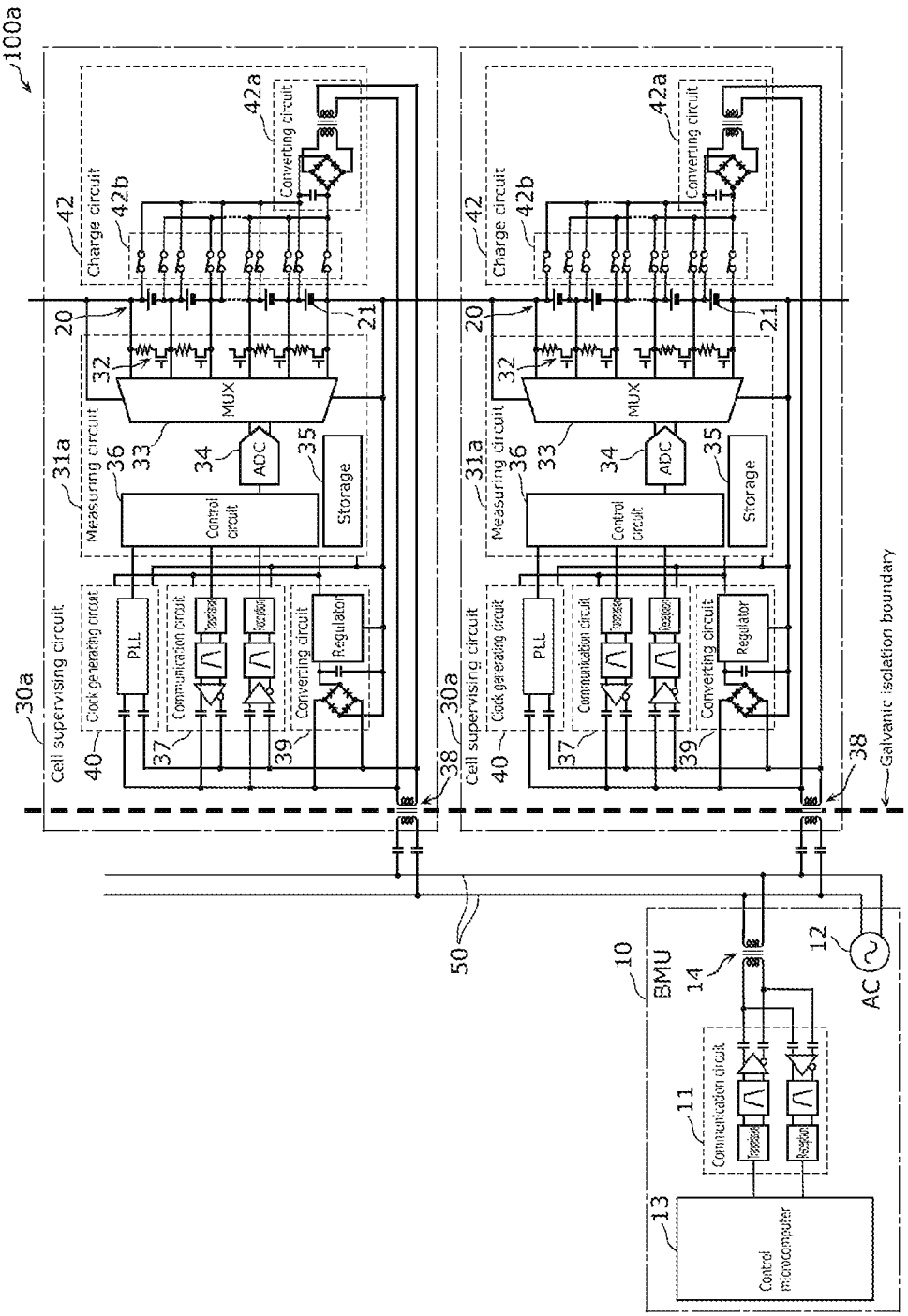
FIG. 3 is a diagram illustrating an outline of the functional configuration of the BMS according to Embodiment 2.

The BMS according to Embodiment 2 will now be described. Initially, the configuration of the BMS according to Embodiment 2 will be described. FIG. 3 is a diagram illustrating an outline of functional configuration of the BMS according to Embodiment 2. In Embodiment 2, differences from Embodiment 1 will be mainly described, and the description of the contents described in Embodiment 1 will be appropriately omitted or simplified.

BMS 100$a$ according to Embodiment 2 includes BMU 10, assembled batteries 20, and cell supervising circuits 30$a$ corresponding to assembled batteries 20.

Unlike cell supervising circuit 30, cell supervising circuit 30$a$ monitors assembled battery 20 including a plurality of secondary battery cells 21. Secondary battery cells 21 are connected to one another in series, and may be partially connected in parallel. Assembled battery 20 may include any number of secondary battery cells 21.

For such cell supervising circuit 30$a$ which monitors a plurality of secondary battery cells 21, measuring circuit 31$a$ included in cell supervising circuit 30$a$ includes a plurality of switching elements 32 and multiplexer 33.

By selectively turning on switching elements 32, multiplexer measures the voltage across secondary battery cell 21 corresponding to switching element 32 turned on. For example, by selectively turning on switching elements 32 in a predetermined order, multiplexer 33 measures the voltage of each of secondary battery cells 21 included in one assembled battery 20.

Cell supervising circuit 30$a$ includes charge circuit 42, rather than charge circuit 41. Charge circuit 42 includes converting circuit 42$a$ and selecting circuit 42$b$.

Converting circuit 42$a$ converts the AC power obtained through alternating current power line 50 to the DC power. Specifically, converting circuit 42$a$ includes a transformer, a full-wave rectification circuit which converts the AC power fed via this transformer into the DC power (DC voltage), and a smoothing circuit which smooths the DC voltage output from the full-wave rectification circuit. Converting circuit 42$a$ is a converting circuit different from converting circuit 39.

Selecting circuit 42$b$ is a circuit which selectively charges secondary battery cells 21, which are the targets monitored by cell supervising circuit 30$a$. Specifically, selecting circuit 42$b$ switches two output terminals of the full-wave rectification circuit included in converting circuit 42a to be electrically connected to one of secondary battery cells 21. In other words, selecting circuit 42b switches secondary battery cells 21 as the target to be charged. Selecting circuit 42b is implemented by a plurality of switching elements, and on/off control of the switching elements is performed by control circuit 36, for example.

Usually, when the cell supervising circuit monitors a plurality of secondary battery cells connected in series, these secondary battery cells have different reference potentials. For this reason, to selectively charge the secondary battery cells, charging should be performed by raising the reference voltage from the lowest potential (GND) of the cell supervising circuit using an inverter, a DC-DC converter, or a charge pump. In other words, voltage shift should be performed.

In contrast, in BMS 100a, the AC power is fed to cell supervising circuit 30a. Charge circuit 42 can easily perform voltage shift utilizing the feed of the AC power according to the circuit configuration above.

[Operation]

Figure 4:
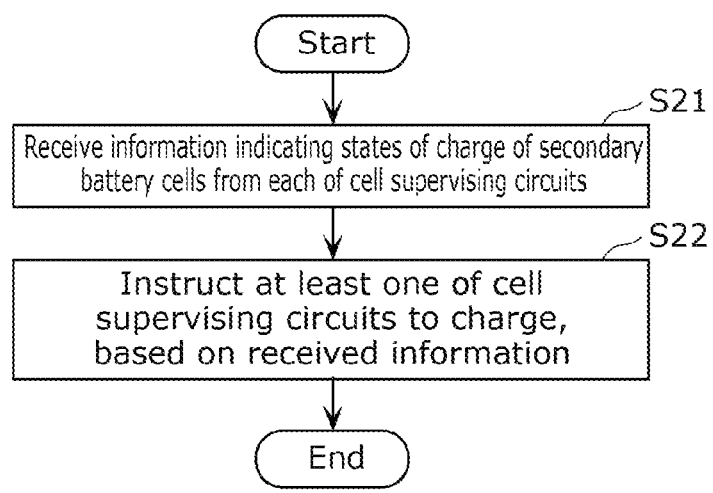
FIG. 4 is a flowchart illustrating the operation of the BMS according to Embodiment 2.

The operation of BMS 100a will now be described. FIG. 4 is a flowchart illustrating the operation of BMS 100a.

Initially, each of cell supervising circuits 30a transmits pieces of information indicating the states of charge of secondary battery cells 21, which are measured by measuring circuit 31, to communication circuit 37. Communication circuit 11 in BMU 10 receives the pieces of information indicating the states of charge of secondary battery cells 21, which are the targets monitored by each of cell supervising circuits 30a, from each of cell supervising circuits 30a (S21). As described above, each information contains an address. Thus, BMU 10 (control microcomputer 13) can specify cell supervising circuit 30a (assembled battery 20) which transmits the pieces of information. Each cell supervising circuit 30a sequentially transmits the pieces of information indicating the states of charge of secondary battery cells 21. Secondary battery cells 21 as the targets monitored by cell supervising circuit 30a (i.e., secondary battery cells 21 included in one assembled battery 20) are distinguished in this order, for example.

Next, based on the received pieces of information, control microcomputer 13 in BMU 10 instructs at least one of cell supervising circuits 30a to charge secondary battery cells 21 using the AC power obtained through alternating current power line 50 (S22).

Specifically, based on the pieces of information indicating the states of charge, which are received in step S21, control microcomputer 13 specifies secondary battery cell 21 having the highest state of charge as the target cell. Subsequently, control microcomputer 13 instructs another cell supervising circuit 30a which monitors another secondary battery cell 21 other than the target cell to charge another secondary battery cell 21 monitored by another cell supervising circuit 30a until the state of charge of another secondary battery cell 21 is substantially equal to the state of charge of the target cell. This instruction is performed through communication between communication circuit 11 and communication circuit 37 (i.e., communication using alternating current power line 50), and control circuit 36 of cell supervising circuit 30a which receives the instruction to cause charge circuit 42 to charge secondary battery cell 21. In other words, based in the instruction from BMU 10, charge circuit 42 performs discharge from secondary battery cell 21 to alternating current power line 50.

As described above, BMS 100a can successfully provide cell balancing among secondary battery cells 21 by charging secondary battery cell 21. The active cell balancing processing implemented by BMS 100a can suppress heat generation, which is a problem in the passive cell balancing processing.

Embodiment 3

[Configuration]

Figure 5:
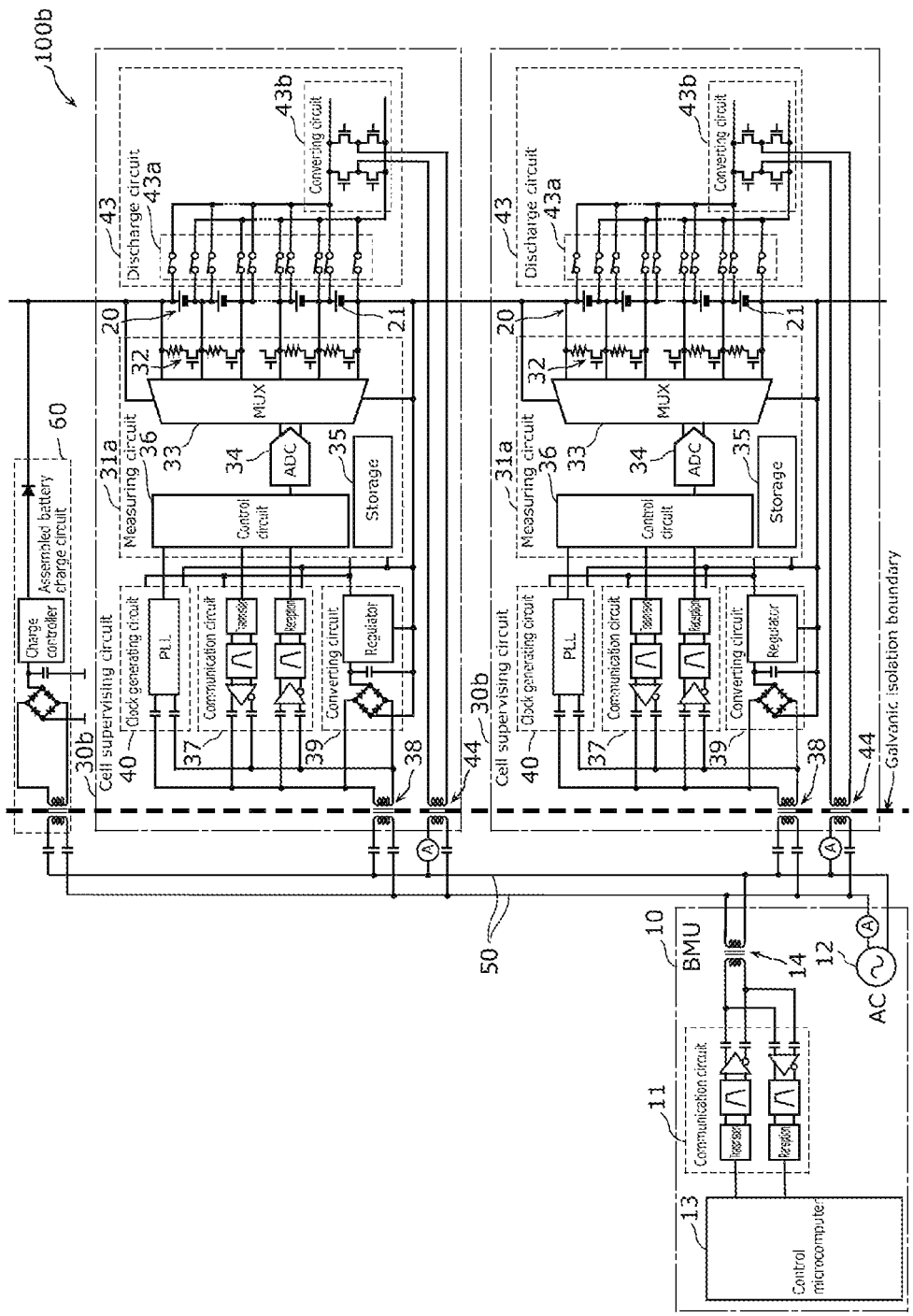
FIG. 5 is a diagram illustrating an outline of the functional configuration of the BMS according to Embodiment 3.

The BMS according to Embodiment 3 will now be described. Initially, the configuration of the BMS according to Embodiment 3 will be described. FIG. 5 is a diagram illustrating an outline of the functional configuration of the BMS according to Embodiment 3. In Embodiment 3, differences from Embodiments 1 and 2 will be mainly described, and the description of the contents described in Embodiments 1 and 2 will be appropriately omitted or simplified.

BMS 100b according to Embodiment 3 includes BMU 10, assembled batteries 20, cell supervising circuits 30b corresponding to assembled batteries 20, and assembled battery charge circuit 60.

Unlike cell supervising circuit 30a, cell supervising circuit 30b includes discharge circuit 43 rather than charge circuit 42. Discharge circuit 43 includes selecting circuit 43a and converting circuit 43b.

Selecting circuit 43a is a circuit for selectively discharging a plurality of secondary battery cells 21, which are the targets monitored by cell supervising circuit 30b. Specifically, selecting circuit 43a switches two input terminals of converting circuit 43b to be electrically connected to one of secondary battery cells 21. In other words, selecting circuit 43a switches secondary battery cells 21 as the discharge target. Selecting circuit 43a is implements by a plurality of switching elements, and on/off control of the switching elements is performed by control circuit 36, for example.

Converting circuit 43b converts the DC power obtained through discharge of secondary battery cell 21 into the AC power, and outputs the AC power to alternating current power line 50. Specifically, converting circuit 43b is an inverter circuit configured of four switching elements. On/off control of the four switching elements is performed by control circuit 36, for example.

BMS 100b includes assembled battery charge circuit 60. Assembled battery charge circuit 60 is a circuit for charging assembled batteries 20 each including a plurality of secondary battery cells 21 (more specifically, assembled batteries 20 connected in series) using the AC power obtained through alternating current power line 50 by the discharge operation by discharge circuit 43. Specifically, assembled battery charge circuit 60 includes a transformer connected to alternating current power line 50, a full-wave rectification circuit which converts the AC power fed via this transformer to the DC power, a smoothing circuit which smooths the DC voltage output by the full-wave rectification circuit, and a charge controller which performs on/off control of charge.

[Operation]

Figure 6:
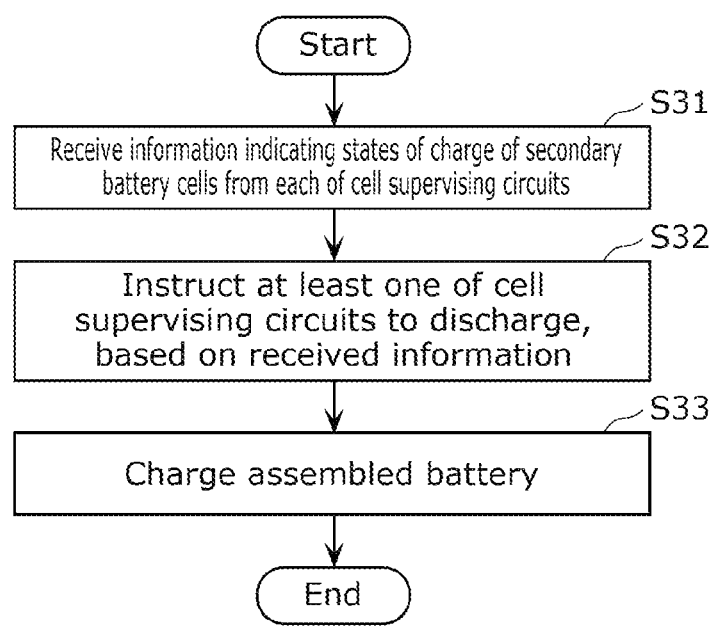
FIG. 6 is a flowchart illustrating the operation of the BMS according to Embodiment 3.

The operation of BMS 100b will now be described. FIG. 6 is a flowchart illustrating the operation of BMS 100b.

Initially, each of cell supervising circuits 30b transmits pieces of information indicating the states of charge of secondary battery cells 21, which are measured by measuring circuit 31, through communication circuit 37. Communication circuit 11 in BMU 10 receives the pieces of information indicating the states of charge of secondary battery cells 21, which are the targets monitored by each of cell supervising circuits 30b, from each of cell supervising circuits 30b (S31). As described above, each information contains an address, and BMU 10 (control microcomputer 13) can specify cell supervising circuit 30b (assembled battery 20) which transmits the information.

Each cell supervising circuit 30b sequentially transmits the pieces of information indicating the states of charge of secondary battery cells 21. Secondary battery cells 21 as the targets monitored by each cell supervising circuit 30b (i.e., secondary battery cells 21 included in one assembled battery 20) are distinguished in this order, for example.

Next, based on the received pieces of information, control microcomputer 13 in BMU 10 instructs at least one of cell supervising circuits 30b to discharge secondary battery cells 21 using the AC power obtained through alternating current power line 50 (S32).

Specifically, based on the pieces of information indicating the states of charge, which are received in step S31, control microcomputer 13 specifies secondary battery cell 21 having the lowest state of charge as the target cell. Subsequently, control microcomputer 13 instructs another cell supervising circuit 30b which monitors another secondary battery cell 21 other than the target cell to discharge secondary battery cell 21 monitored by another cell supervising circuit 30b until the state of charge of another secondary battery cell 21 is substantially equal to the state of charge of the target cell. This instruction is performed through communication between communication circuit 11 and communication circuit 37 (i.e., communication using alternating current power line 50), and control circuit 36 of cell supervising circuit 30b which receives the instruction causes discharge circuit 43 to discharge secondary battery cell 21. In other words, based on the instruction from BMU 10, discharge circuit 43 performs discharge from secondary battery cell 21 to alternating current power line 50.

When discharge to alternating current power line 50 (in other words, addition of the AC power) is performed by discharge circuit 43, the frequency and the phase of the discharged energy should be matched with those of alternating current power supply 12. In BMS 100b, the AC power is fed to cell supervising circuit 30b via transformer 38. For this reason, by monitoring the AC power and controlling discharge circuit 43, cell supervising circuit 30b (specifically, control circuit 36 or the like) can readily match the frequency and the phase of the discharged energy with those of alternating current power supply 12. In addition of the AC power, the direction of the current of the discharged energy is appropriately adjusted using an ammeter (the component represented by symbol "A" in FIG. 5).

Here, although the electric power discharged to alternating current power line 50 by discharge circuit 43 may be used in any manner, the electric power is regenerated to assembled battery 20 in BMS 100b. In other words, assembled battery 20 is charged (S33). Specifically, for example, assembled battery charge circuit 60 (charge controller) is turned on by an instruction transmitted by BMU 10 (control microcomputer 13) via the communication path (not illustrated in FIG. 5) using alternating current power line 50.

As described above, BMS 100b can successfully provide cell balancing among secondary battery cells 21 by discharging secondary battery cell 21. The active cell balancing processing implemented by BMS 100b can suppress heat generation, which is a problem in the passive cell balancing processing.

Although the standard active cell balancing processing has a problem in treatment of the discharged energy, BMS 100b can readily regenerate the discharged energy to assembled battery 20 by outputting the discharged energy to alternating current power line 50.

To be noted, it is more preferred that BMS 100b match the total of the discharged energy (the electric power added in the cell balancing processing) and the AC power output by alternating current power supply 12 with the electric power consumed by the entire system.

Embodiment 4

[Configuration]

Figure 7:
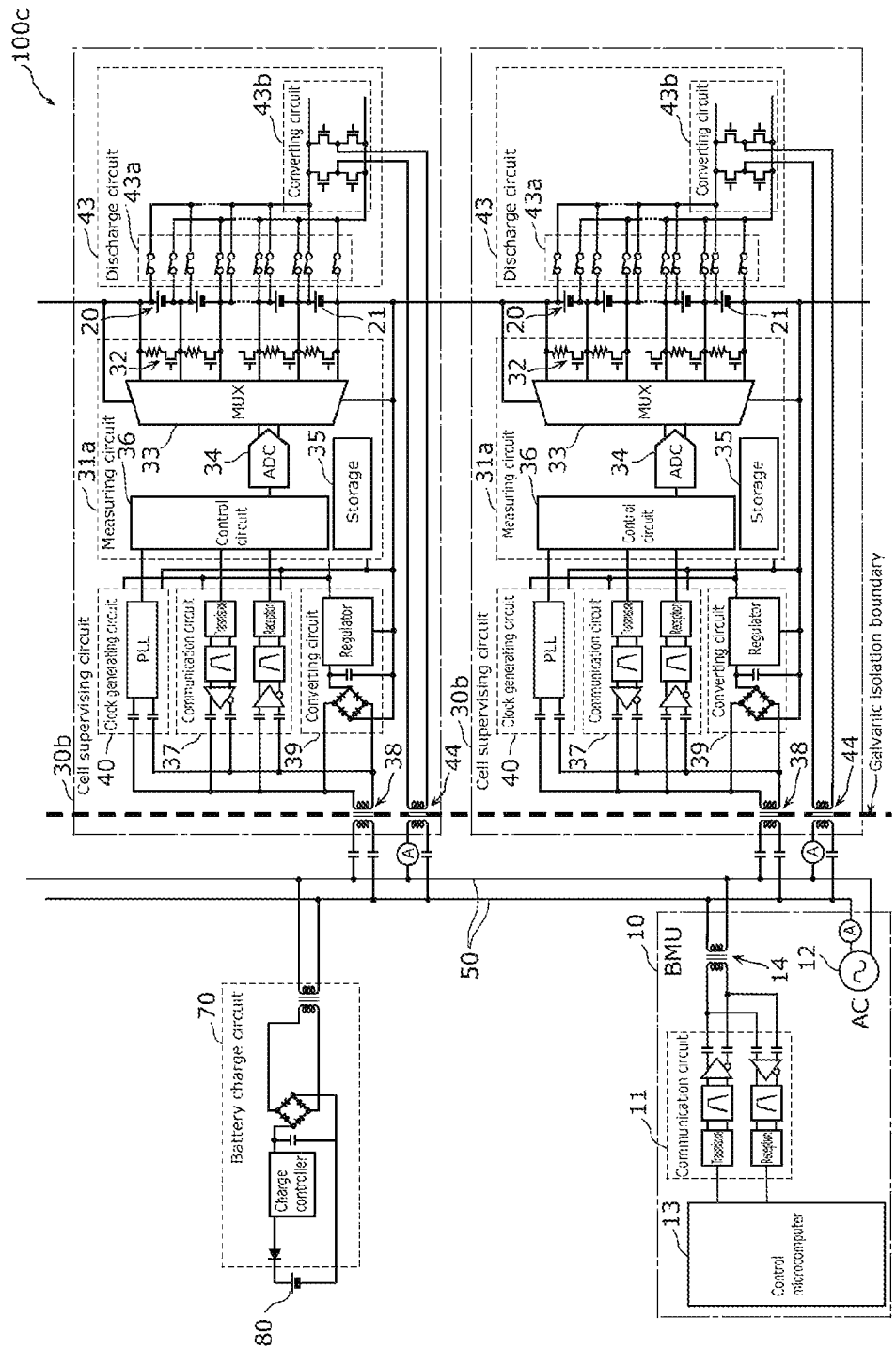
FIG. 7 is a diagram illustrating an outline of the functional configuration of the BMS according to Embodiment 4.

The BMS according to Embodiment 4 will now be described. Initially, the configuration of the BMS according to Embodiment 4 will be described. FIG. 7 is a diagram illustrating an outline of the functional configuration of the BMS according to Embodiment 4. In Embodiment 4, the differences from Embodiments 1 to 3 will be mainly described, and the description of the contents described in Embodiments 1 to 3 will be appropriately omitted or simplified.

BMS 100c according to Embodiment 4 includes BMU 10, assembled batteries 20, cell supervising circuits 30b corresponding to assembled batteries 20, and battery charge circuit 70.

Unlike BMS 100b, BMS 100c includes battery charge circuit 70 rather than assembled battery charge circuit 60.

Battery charge circuit 70 is a circuit for charging battery 80 different from assembled batteries 20 (secondary battery cells 21) using the AC power obtained through alternating current power line 50 by discharging discharge circuit 43. Battery 80 is a 12 V battery mounted on vehicles, for example, and is galvanically isolated from assembled batteries 20. Specifically, battery charge circuit 70 includes a transformer connected to alternating current power line 50, a full-wave rectification circuit which converts the AC power fed via the transformer to the DC power, a smoothing circuit which smooths the DC voltage output by the full-wave rectification circuit, and a charge controller which controls on/off of charge.

[Operation]

Figure 8:
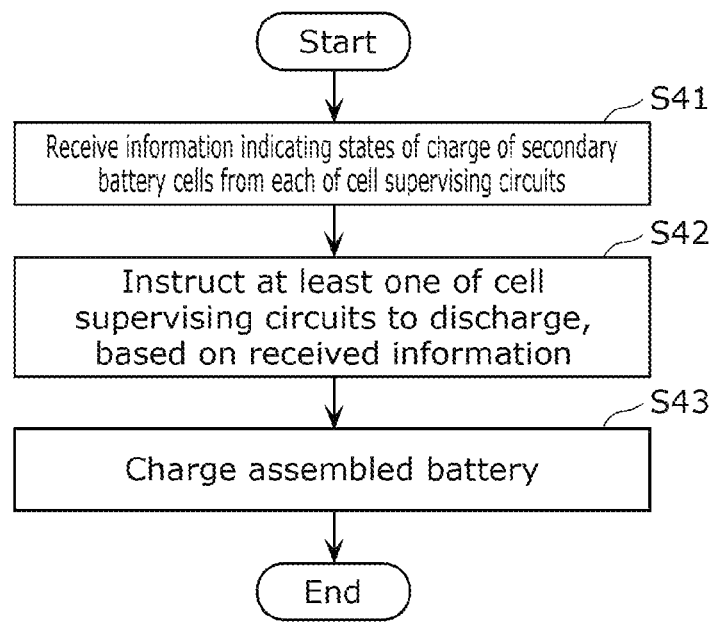
FIG. 8 is a flowchart illustrating the operation of the BMS according to Embodiment 4.

The operation of BMS 100c will now be described. FIG. 8 is a flowchart illustrating the operation of BMS 100c.

Initially, communication circuit 11 in BMU 10 receives pieces of information indicating the states of charge of secondary battery cells 21 monitored by each of cell supervising circuits 30b from each of cell supervising circuits 30b (S41). The processing in step S41 is the same as that in step S31.

Next, based on the received pieces of information, control microcomputer 13 in BMU 10 instructs at least one of cell supervising circuits 30b to discharge secondary battery cells 21 using the AC power obtained through alternating current power line 50 (S42). The processing in step S42 is the same as that in step S32.

In BMS 100c, the electric power discharged by discharge circuit 43 to alternating current power line 50 is regenerated across the galvanic isolation boundary to battery 80 different from assembled battery 20. In other words, battery 80 is charged (S43). Specifically, for example, battery charge circuit 70 (charge controller) is turned on by an instruction transmitted by BMU 10 (control microcomputer 13) via a communication path (not illustrated in FIG. 7) using alternating current power line 50.

As described above, BMS 100c can successfully provide cell balancing among secondary battery cells 21 by discharging secondary battery cells 21. The active cell balancing processing implemented by BMS 100c can suppress heat generation, which is a problem in the passive cell balancing processing.

Although the standard active cell balancing processing has a problem in treatment of the discharged energy, BMS 100c can readily regenerate the discharged energy to battery 80 (i.e., regeneration of the electric power across the galvanic isolation boundary) by outputting the discharged energy to alternating current power line 50.

To be noted, it is more preferred that BMS 100c match the total of the discharged energy (the electric power added in the cell balancing processing) and the AC power output by alternating current power supply 12 with the electric power consumed by the entire system.

SUMMARY

As described above, BMS 100 includes cell supervising circuits 30 connected to alternating current power line 50, and BMU 10 connected to alternating current power line 50. BMU 10 includes control microcomputer 13 which instructs at least one of cell supervising circuits 30 to control the state of charge of secondary battery cell 21 monitored by the at least one of cell supervising circuits 30, based on the pieces of information in cell supervising circuits 30, the information indicating the state of charge of storage cell 21 monitored by each of cell supervising circuits 30. Transformer 38 and transformer 14 are one example of the insulating element, and BMU 10 is one example of the management device. Secondary battery cell 21 is one example of the storage cell, and control microcomputer 13 is one example of the information processor. Control of the state of charge means adjustment of the state of charge in other words.

Such BMS 100 can successfully provide cell balancing among secondary battery cells 21 connected to cell supervising circuits 30, respectively. BMS 100 can suppress the failure of cell balancing caused by a variation in operating power among cell supervising circuits 30 because cell supervising circuits 30 can operate by the electric power fed from alternating current power supply 12, which is a power supply different from secondary battery cells 21.

Moreover, each of cell supervising circuits 30 includes communication circuit 37 which transmits the information, for example. BMU 10 further includes communication circuit 11 which receives the information. Communication circuit 37 and communication circuit 11 communicate with each other via alternating current power line 50. Communication circuit 37 is one example of the first communication circuit, and communication circuit 11 is one example of the second communication circuit.

Such BMS 100 also uses the power supply path from alternating current power supply 12 (which is a power supply different from secondary battery cells 21) to cell supervising circuits 30 as a communication path between BMU 10 and cell supervising circuits 30. For this reason, BMS 100 can prevent addition of components related with communication, and can suppress the failure of cell balancing caused by a variation in operating power among cell supervising circuits 30.

Moreover, each of cell supervising circuits 30 monitors only one secondary battery cell 21, for example.

Such BMS 100 can successfully provide cell balancing among secondary battery cells 21 connected to cell supervising circuits 30, respectively.

Moreover, control microcomputer 13 gives an instruction for charge as control of the state of charge, for example. Each of cell supervising circuits 30 includes converting circuit 39 which controls the AC power obtained through alternating current power line 50 to the DC power, and charge circuit 41 for charging secondary battery cell 21 using the DC power, secondary battery cell 21 being monitored by cell supervising circuit 30.

Such BMS 100 can successfully provide cell balancing among secondary battery cells 21 connected to cell supervising circuits 30, respectively, by charging secondary battery cell 21.

Moreover, in BMS 100a, each of cell supervising circuits 30a monitors a plurality of secondary battery cells 21, for example.

Such BMS 100a can successfully provide cell balancing among pluralities of secondary battery cells 21 connected to cell supervising circuits 30a, respectively, and among each of the pluralities of secondary battery cells 21 connected to its corresponding cell supervising circuit 30a.

Moreover, in BMS 100a, control microcomputer 13 gives an instruction for charge as the control of the state of charge, for example. Each of cell supervising circuits 30a includes converting circuit 42a which converts the AC power obtained through alternating current power line 50 to the DC power, and selecting circuit 42b for selectively charging the plurality of secondary battery cells 21 monitored by cell supervising circuit 30a.

By charging secondary battery cell 21, such BMS 100a can successfully provide cell balancing among pluralities of secondary battery cells 21 connected to cell supervising circuits 30a, respectively, and among each of the pluralities of secondary battery cells 21 connected to its corresponding cell supervising circuit 30a.

Moreover, in BMS 100b, control microcomputer 13 gives an instruction for discharge as the control of the state of charge, for example. Each of cell supervising circuits 30b includes selecting circuit 43a for selectively discharging a plurality of secondary battery cells 21 monitored by cell supervising circuit 30b, and converting circuit 43b which converts the DC power obtained by the discharging to the AC power, and outputs the AC power to alternating current power line 50.

By discharging secondary battery cell 21, BMS 100a can successfully provide cell balancing among pluralities of secondary battery cells 21 connected to cell supervising circuits 30a, respectively, and among each of the pluralities of secondary battery cells 21 connected to its corresponding cell supervising circuit 30a.

Moreover, in BMS 100b, control microcomputer 13 gives an instruction for discharge to alternating current power line 50 as the control of the state of charge, for example. BMS 100b further includes assembled battery charge circuit 60 for charging assembled battery 20 including secondary battery cells 21 using the AC power obtained through alternating current power line 50 by the discharge.

By discharging secondary battery cell 21, such BMS 100b can successfully provide cell balancing among pluralities of secondary battery cells 21 connected to cell supervising circuits 30b, respectively, and can regenerate the discharged energy to assembled battery 20.

Moreover, in BMS 100c, control microcomputer 13 gives an instruction for discharge to alternating current power line 50 as the control of state of charge, for example. BMS 100c further includes battery charge circuit 70 for charging battery 80 different from secondary battery cell 21 using the AC power obtained through alternating current power line 50 by the discharge.

By discharging secondary battery cell 21, such BMS 100b can successfully provide cell balancing among pluralities of secondary battery cells 21 connected to cell supervising circuits 30b, respectively, and can regenerate the discharged energy to battery 80.

Moreover, cell supervising circuit 30 which monitors secondary battery cell 21 includes transformer 38 for receiving electric power through alternating current power line 50 in a non-contact manner, communication circuit 37 which receives an instruction to control the state of charge of secondary battery cell 21 from BMU 10 which manages the states of secondary battery cells 21, BMU 10 being connected to transformer 14 via alternating current power line 50, and a circuit which controls the state of charge of secondary battery cell 21 based on the instruction.

Such cell supervising circuit 30 can suppress the failure of cell balancing caused by a variation in operating power among cell supervising circuits 30 because cell supervising circuit 30 can operate by the electric power fed by alternating current power supply 12, which is a power supply different from secondary battery cell 21.

Moreover, in cell supervising circuit 30, the circuit is charge circuit 41 which charges secondary battery cell 21 based on the instruction using the AC power obtained through alternating current power line 50, for example. In cell supervising circuit 30a, the circuit is charge circuit 42 which charges secondary battery cell 21 based on the instruction using the AC power obtained through alternating current power line 50.

By charging secondary battery cell 21 based on the instruction, such cell supervising circuit 30 can successfully provide cell balancing between secondary battery cell 21 and secondary battery cells 21 connected to other cell supervising circuits 30. The same applies to cell supervising circuit 30a.

Moreover, in cell supervising circuit 30b, the circuit is discharge circuit 43 which performs discharge from secondary battery cell 21 to alternating current power line 50 based on the instruction, for example.

By discharging secondary battery cell 21 based on the instruction, such cell supervising circuit 30b can successfully provide cell balancing between secondary battery cell 21 and secondary battery cells 21 connected to other cell supervising circuits 30b.

Other Embodiments

The embodiments have been described above, but these embodiments should not be construed as limitations to the present disclosure.

For example, although the communication between the BMU and each of the cell supervising circuits is performed using the alternating current power line in the embodiments above, the communication may be performed using a dedicated communication line different from the alternating current power line. In other words, the communication performed using the alternating current power line is not essential.

Embodiments 1 to 4 above may be arbitrarily combined. For example, in the configuration where one cell supervising circuit monitors only one secondary battery cell, the cell supervising circuit may include a discharge circuit. Alternatively, the cell supervising circuit may include both of the discharge circuit and the charge circuit.

For example, although the transformer is exemplified as the insulating element in the embodiments above, the insulating element may be another insulating element such as an electromagnetic resonance coupler.

Although the assembled battery used in electric vehicles are managed in the embodiments above, the BMS may manage batteries used in any application.

The circuit configurations described in the embodiments above are exemplary, and these circuit configurations should not be construed as limitations to the present disclosure. In other words, the present disclosure also covers circuits which can implement the functions characteristic to the present disclosure, as well as the circuit configurations above. For example, the present disclosure covers circuits where an element such as a switching element (transistor), a resistor element, or a capacitive element is connected to an element in series or in parallel in the range enabling the same functions as those of the circuit configurations above.

The components included in the cell supervising circuit may be integrated in any manner in the embodiments above. For example, the measuring circuit and the communication circuit may be implemented as a single integrated circuit, or may be implemented as separate integrated circuits.

The cell supervising circuit is implemented by hardware in the embodiments above. However, part of the components included in the cell supervising circuit may be implemented by executing software programs suitable for the components. Part of the components included in the cell supervising circuit may be implemented by a program executor such as a central processing unit (CPU) or a processor, which reads out and executes software programs recorded on a recording medium such as a hard disk or a semiconductor memory.

The information processor is implemented by a microcomputer in the embodiments above. In other words, the functions of the information processor are implemented by a program executor such as a CPU or a processor, which reads out and executes software programs recorded on a recording medium such as a hard disk or a semiconductor memory. However, the information processor may be partially implemented by hardware.

Moreover, the processing executed by the specific processor in the embodiments above may be executed by another processor. In the operations described in the embodiments above, the order of processings may be changed, or several processings may be performed in parallel.

Besides, the present disclosure also covers embodiments obtained by performing a variety of modifications conceived by persons skilled in the art on the embodiments above or embodiments including any combination of the components and the functions in the embodiments above without departing the gist of the present disclosure.

For example, the present disclosure may be implemented as a BMU, a storage capacitor management system, or a storage capacitor management unit. The present disclosure may be implemented as a vehicle (such as an electric vehicle) on which the cell supervising circuit or the BMS according any one of the embodiments above is mounted. The present disclosure may be implemented as an apparatus other than vehicles on which the cell supervising circuit or the BMS according to any one of the embodiments above is mounted.

INDUSTRIAL APPLICABILITY

The BMS according to the present disclosure and the cell supervising circuit included in the same can be used in broad applications such as applications to vehicles.

The invention claimed is:

1. A battery management system, comprising:
cell supervising circuits connected to an alternating current power line and configured to receive power supply from the alternating current power line; and a management device connected to the alternating current power line, wherein:

the management device includes:
- an information processor which instructs at least one of the cell supervising circuits to control a state of charge of a storage cell monitored by the at least one of the cell supervising circuits, based on pieces of information in the cell supervising circuits, the information indicating a state of charge of a storage cell monitored by each of the cell supervising circuits; and
- an alternating current power supply, each of the cell supervising circuits includes an insulating element and a first communication circuit which transmits the information, the management device further includes a second communication circuit which receives the information, the alternating current power supply feeds power to each of the cell supervising circuits via the insulating element, the first communication circuit and the second communication circuit communicate with each other via the insulating element, and the first communication circuit and the second communication circuit use a frequency bandwidth higher than a frequency of alternating current power obtained through the alternating current power line.

2. The battery management system according to claim 1, wherein each of the cell supervising circuits monitors only one storage cell.

3. The battery management system according to claim 2, wherein the information processor gives an instruction for charge as control of the state of charge, and each of the cell supervising circuits includes:
- a converting circuit which converts an alternating current (AC) power obtained through the alternating current power line to a direct current (DC) power; and
- a charge circuit for charging the only one storage cell using the DC power, the storage cell being monitored by the cell supervising circuit.

4. The battery management system according to claim 1, wherein each of the cell supervising circuits monitors a plurality of storage cells.

5. The battery management system according to claim 4, wherein the information processor gives an instruction for charge as the control of the state of charge, and each of the cell supervising circuits includes:
- a converting circuit which converts an AC power obtained through the alternating current power line to a DC power; and
- a selecting circuit for selectively charging the plurality of storage cells monitored by the cell supervising circuit.

6. The battery management system according to claim 4, wherein the information processor gives an instruction for discharge as the control of the state of charge, and each of the cell supervising circuits includes:
- a selecting circuit for selectively discharging the plurality of storage cells monitored by the cell supervising circuit; and
- a converting circuit which converts a DC power obtained by the selectively discharging to an AC power, and outputs the AC power to the alternating current power line.

7. The battery management system according to claim 1, wherein the information processor gives an instruction for discharge to the alternating current power line as the control of the state of charge, and the battery management system further includes an assembled battery charge circuit for charging an assembled battery including the storage cells using an AC power obtained through the alternating current power line by the discharge.

8. The battery management system according to claim 1, wherein the information processor gives an instruction for discharge to the alternating current power line as the control of the state of charge, and the battery management system further comprises a battery charge circuit for charging a battery different from the storage cell using an AC power obtained through the alternating current power line by the discharge.

9. The battery management system according to claim 1, wherein a frequency band for the information processor to communicate with the cell supervising circuits is higher than a frequency of the alternating current power supply to feed the power.

10. A cell supervising circuit which monitors a storage cell, the cell supervising circuit comprising:
- an insulating element for receiving electric power through an alternating current power line in a non-contact manner;
- a communication circuit which receives an instruction to control a state of charge of the storage cell from a management device which manages the state of the storage cell, the management device being connected to the alternating current power line via the insulating element; and
- a circuit which controls the state of charge of the storage cell based on the instruction, wherein:
- the electric power through the alternating current power line is supplied via the insulating element,
- the management device performs communication via the insulating element, and
- the communication circuit and the management device use a frequency bandwidth higher than a frequency of alternating current power obtained through the alternating current power line.

11. The cell supervising circuit according to claim 10, wherein the circuit is a charge circuit which charges the storage cell based on the instruction using an AC power obtained through the alternating current power line.

12. The cell supervising circuit according to claim 10, wherein the circuit is a discharge circuit which performs discharge from the storage cell to the alternating current power line based on the instruction.

13. The cell supervising circuit according to claim 10, wherein a frequency band for the management device to communicate with the cell supervising circuits is higher than a frequency of the alternating current power supply to feed the power.

* * * * *